(12) United States Patent
Oshida et al.

(10) Patent No.: US 9,245,153 B2
(45) Date of Patent: *Jan. 26, 2016

(54) SEMICONDUCTOR DEVICE

(71) Applicant: Renesas Electronics Corporation, Kawasaki-shi, Kanagawa (JP)

(72) Inventors: Daisuke Oshida, Kanagawa (JP); Masayuki Hirokawa, Kanagawa (JP); Akira Yamazaki, Kanagawa (JP); Takashi Fujimori, Kanagawa (JP); Shigemasa Shiota, Kanagawa (JP); Shigeru Furuta, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/294,730

(22) Filed: Jun. 3, 2014

(65) Prior Publication Data

US 2014/0289538 A1 Sep. 25, 2014

Related U.S. Application Data

(63) Continuation of application No. 13/524,000, filed on Jun. 15, 2012, now Pat. No. 8,782,432.

(30) Foreign Application Priority Data

Jun. 20, 2011 (JP) .................. 2011-136134

(51) Int. Cl.
*G06F 11/30* (2006.01)
*G06F 21/78* (2013.01)
(Continued)

(52) U.S. Cl.
CPC ............ *G06F 21/78* (2013.01); *G06F 12/1408* (2013.01); *G06F 21/72* (2013.01);
(Continued)

(58) Field of Classification Search
CPC ...... G06F 12/1408; G06F 21/72; G06F 21/73; G06F 21/78; G06F 21/79; G06F 2221/2107; G06F 2221/2129; H04L 2209/08; H04L 2209/12; H04L 9/002; H04L 9/0866
USPC ........................................................ 713/189
See application file for complete search history.

(56) References Cited

U.S. PATENT DOCUMENTS 6,240,517 B1 5/2001 Nishioka
6,572,024 B1 6/2003 Baldischweiler et al.
(Continued)

FOREIGN PATENT DOCUMENTS

EP 1 983 466 A2 10/2008
JP 11-045508 A 2/1999
(Continued)

OTHER PUBLICATIONS

European Search Report dated Aug. 13, 2014 for European Application No. 12169346.
(Continued)

*Primary Examiner* — Dant Shaifer Harriman
*Assistant Examiner* — Abiy Getachew
(74) *Attorney, Agent, or Firm* — Shapiro, Gabor and Rosenberger, PLLC

(57) ABSTRACT

A semiconductor device in related art has a problem that security on confidential information stored is insufficient. A semiconductor device of the present invention has a unique code which is unique to a device and generates unique code corresponding information from the unique code. The semiconductor device has a memory region in which specific information obtained by encrypting confidential information is stored in a region associated with the unique code corresponding information. The specific information read from the memory region is encrypted with the unique code corresponding information to generate the confidential information.

8 Claims, 13 Drawing Sheets

(51) Int. Cl.
*G06F 21/73* (2013.01)
*G06F 21/79* (2013.01)
*H04L 9/00* (2006.01)
*H04L 9/08* (2006.01)
*G06F 12/14* (2006.01)
*G06F 21/72* (2013.01)

(52) U.S. Cl.
CPC ............... *G06F 21/73* (2013.01); *G06F 21/79* (2013.01); *H04L 9/002* (2013.01); *H04L 9/0866* (2013.01); *G06F 2221/2107* (2013.01); *G06F 2221/2129* (2013.01); *H04L 2209/08* (2013.01); *H04L 2209/12* (2013.01)

(56) References Cited

U.S. PATENT DOCUMENTS

| | | | | |
|---|---|---|---|---|
| 7,120,513 | B1* | 10/2006 | Akram et al. | 700/121 |
| 7,228,423 | B2 | 6/2007 | Asai et al. | |
| 7,334,131 | B2 | 2/2008 | Orlando et al. | |
| 7,757,297 | B2* | 7/2010 | Herberth et al. | 726/28 |
| 8,300,450 | B2* | 10/2012 | Christensen et al. | 365/149 |
| 2004/0187012 | A1 | 9/2004 | Kohiyama et al. | |
| 2005/0144542 | A1* | 6/2005 | Minagawa et al. | 714/54 |
| 2006/0064325 | A1 | 3/2006 | Matsumoto et al. | |
| 2008/0320318 | A1* | 12/2008 | Huang | 713/193 |
| 2011/0043546 | A1 | 2/2011 | Matsumoto | |

FOREIGN PATENT DOCUMENTS

| | | |
|---|---|---|
| JP | 2002-026902 | 1/2002 |
| JP | 2003-500786 | 1/2003 |
| JP | 2003-051820 | 2/2003 |
| JP | 2005-018725 | 1/2005 |
| JP | 2010-074355 A | 4/2012 |
| WO | WO 99/17495 A1 | 4/1999 |
| WO | WO 2010/100015 A1 | 9/2010 |

OTHER PUBLICATIONS

Office Action issued Nov. 4, 2014, in Japanese Patent Application No. 2011-136134.

* cited by examiner

FIG. 13

DIGEST VALUE DI = 4
READ ADDRESS = DI = 4
DIVISION NUMBER = 4

| ADDRESS | STORED DATA | |
|---|---|---|
| 1 | Dd | |
| 2 | Dd | |
| 3 | Dd | |
| 4 | HF2 [0:31] | Dd |
| 5 | HF2 [32:63] | Dd |
| 6 | HF2 [64:95] | Dd |
| 7 | HF2 [96:127] | Dd |
| 8 | Dd | |
| 9 | Dd | |
| 10 | Dd | |
| ⋮ | ⋮ | |
| n | Dd | |

FIG. 14

DIGEST VALUE DI = 4
READ ADDRESS = DI = 4
THE NUMBER OF DIVIDED BITS = 4

| ADDRESS | STORED DATA | |
|---|---|---|
| 1 | Dd | |
| 2 | Dd | |
| 3 | Dd | |
| 4 | HF2 [0:3] | Dd |
| 5 | HF2 [4:7] | Dd |
| 6 | HF2 [8:11] | Dd |
| 7 | HF2 [12:15] | Dd |
| 8 | HF2 [16:19] | Dd |
| 9 | HF2 [20:23] | Dd |
| 10 | HF2 [24:27] | Dd |
| ⋮ | ⋮ | |
| n | Dd | |

SEMICONDUCTOR DEVICE

CROSS-REFERENCE TO RELATED APPLICATIONS

The disclosure of Japanese Patent Application No. 2011-136134 filed on Jun. 20, 2011 including the specification, drawings and abstract is incorporated herein by reference in its entirety.

BACKGROUND

The present invention relates to a semiconductor device and, more particularly, to a semiconductor device in which security measures are implemented on information held in an internal memory or the like.

In recent years, many security techniques using encryption technology for improvement in resistance to an unauthorized access to a semiconductor device or prevention of imitation are proposed. In the encryption technology, an encryption key is used. Patent documents 1 and 2 disclose techniques of security measures using the encryption key.

Patent document 1 discloses a technique that, at the time of writing data to a recording medium, by writing dummy data in a dummy address generated on the basis of an encryption key, regular data and the dummy data are recorded in a merged state in the recording medium. The technique of Patent document 1 prevents illegality such as data copy. Patent document 2 discloses a technique of generating an encryption value by encrypting an invariant information piece by using a digest table, applying a hash function to the encryption value to obtain a hash value, and using it as a recording address which corresponds to the invariant information piece on a one-to-one basis. In Patent document 2, there are a plurality of encryption keys in the digest table, and a recording address is varied among the encryption keys. Consequently, in Patent document 2, resistance to an attack such as an attack attempted using an invariant information piece generating the same hash value can be improved.

RELATED ART DOCUMENTS

Patent Documents

Patent document 1: Japanese Unexamined Patent Publication No. Hei 11 (1999)-045508
Patent document 2: Japanese Unexamined Patent Publication No. 2010-074355

SUMMARY

For example, in a semiconductor device performing encrypted communication, confidential information such as an encryption key used for communication is written in a nonvolatile memory such as a flash memory after manufacture of the semiconductor device. The nonvolatile memory can be accessed from a CPU (Central Processing Unit) and information stored in the nonvolatile memory can be easily read. There is consequently a problem such that, in the case where the semiconductor device is analyzed, information in a memory region in which the confidential information is stored is stolen. To address the problem, in the technique disclosed in the patent document 1, by writing dummy data in a dummy address uniquely generated on the basis of an encryption key, security level is improved. There is, however, a problem such that since the dummy data is written in the same address by a device, by collecting a large amount of data stored in the nonvolatile memory region, the address in which the dummy data is written is decrypted. In the technique disclosed in the patent document 2, a device storing an address in which dummy data is written is prepared in a semiconductor device to prevent dummy data from being written in the same address. The technique, however, has problems such that response decreases due to occurrence of a sequence of recognizing an address in which data is written at the time of generating the address, and cost increases because a circuit storing the address is newly necessary. It has also a problem such that since confidential information and dummy data is sequentially written, each of the confidential information is read by an attack such as a side channel attack of illegally accessing a channel between a semiconductor device and a writing device.

A representative semiconductor device according to the present invention has a unique code which is unique to a device and generates unique code corresponding information from the unique code. The semiconductor device has a memory region in which specific information obtained by encrypting confidential information is stored in a region associated with the unique code corresponding information. The specific information which is read from the memory region is decrypted by using the unique code corresponding information to generate the confidential information.

In the semiconductor device, a region storing confidential information is designated by a unique code which is unique to a device. That is, in the semiconductor device of the present invention, a region storing confidential information varies among devices. It is therefore difficult to specify a region storing confidential information even in the case of collecting a large amount of data in a nonvolatile memory region. Since an address region uniquely determined by a unique code which is unique to a device is used, a device storing an address in which dummy data is written is unnecessary. Further, since confidential information and a dummy data is merged and written in a semiconductor device, it is difficult to specify the confidential information by an attack such as a side channel attack. Thus, in the semiconductor device according to the present invention, stealing of confidential information by analysis is suppressed, and security is improved.

In the semiconductor device according to the present invention, the security level on confidential information is improved.

BRIEF DESCRIPTION OF THE DRAWINGS

FIG. 13 is a schematic diagram showing another example of a method of storing specific information to a memory region.

FIG. 14 is a schematic diagram showing another example of the method of storing specific information to a memory region.

DETAILED DESCRIPTION

First Embodiment

Figure 1:
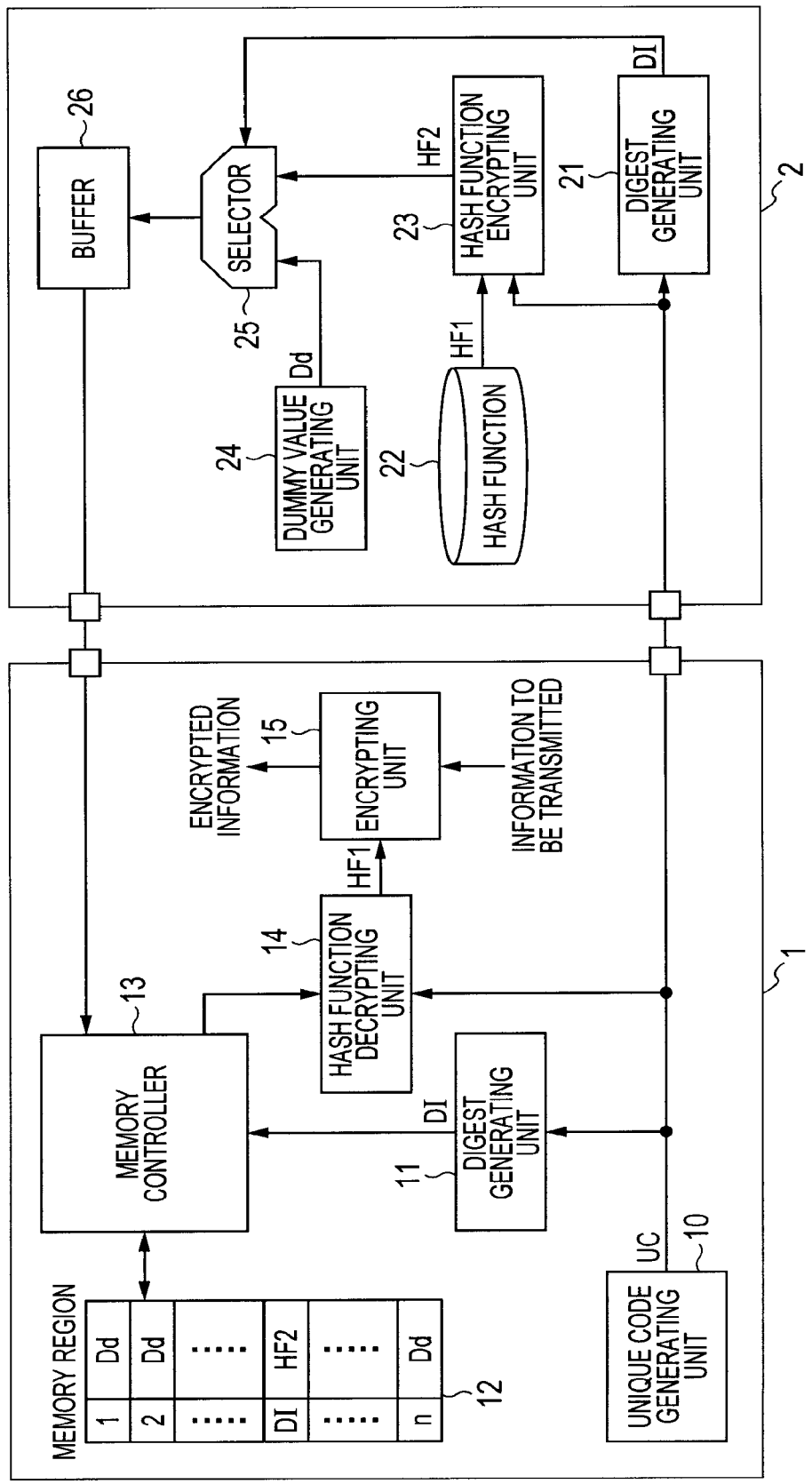
FIG. 1 is a block diagram of a semiconductor device according to a first embodiment and a writing device of writing specific information to the semiconductor device.

Hereinafter, an embodiment of the present invention will be described with reference to the drawings. FIG. 1 is a block diagram showing a semiconductor device 1 according to a first embodiment and a writing device 2 of writing specific information to the semiconductor device 1.

As shown in FIG. 1, the semiconductor device 1 has a unique code generating unit 10, a unique code corresponding information generating unit (for example, a digest generating unit 11), a memory region 12, a memory controller 13, a decrypting unit (for example, a hash function decrypting unit 14), and an encrypting unit 15.

The unique code generating unit 10 generates a unique code unique to a device. For example, the unique code generating unit 10 generates the unique code UC by using an initial value at the time of start of a memory device (for example, SRAM (Static Random Access Memory)) of the semiconductor device 1. The unique code UC is a value generated from a circuit of the same design and is a code generated by using a characteristic that circuits manufactured as semiconductor devices have variations. Such a technique is called a PUF (Physical Unclonable Function) and can realize high confidentiality of data without requiring special hardware such as a tamper-resistant chip called a PUF (Physical Unclonable Function). As the unique code UC, except for the PUF, information peculiar to a semiconductor device such as a CPU IC can be used.

The digest generating unit 11 generates unique code corresponding information (for example, a digest value DI) from a unique code. In the first embodiment, the digest generating unit 11 is used as a unique code corresponding information generating unit. As a unique code corresponding information generating unit, any unit unconditionally generating information corresponding to the address value from the unique code UC may be used and a circuit operating by an algorithm except for the digest generating unit can be used. In the memory region 12, specific information obtained by encrypting confidential information in a region associated with the digest value DI (for example, in the case where the digest value DI is an address to be accessed, the region indicated by the digest value DI) is stored. The memory region 12 may be a part of a nonvolatile memory such as a flash memory or the entire region of the nonvolatile memory. The memory region 12 is a memory region storing specific information obtained by encrypting confidential information and is a storage holding information which is stored even when the power supply is interrupted.

The memory controller 13 generates an address for accessing the memory region on the basis of the digest value DI and reads information from the region corresponding to the address. In the case where a write instruction is sent from the writing device 2, the memory controller 13 writes information in the memory region 12 in accordance with the write instruction.

More concretely, specific information HF2 stored in the semiconductor device 1 is generated by the writing device 2. At the time of writing the specific information HF2, the writing device 2 issues a write instruction by merging a dummy value Dd and the specific information HF2. At this time, the writing device 2 designates the digest value DI of the unique code UC as the write address of the specific information HF2 as a region storing the specific information HF2. The memory controller 13 reads the specific information HF2 as the read address of the digest value DI generated from the unique code UC by the digest generating unit 11 of the semiconductor device 1.

The hash function decrypting unit 14 receives the specific information HF2 read from the region associated with the unique code UC by the memory controller 13. The hash function decryption unit 14 decrypts confidential information (for example, a hash function HF1) from the specific information HF2 with the unique code UC. The confidential information HF1 is a hash function (for example, an encryption key) used for encrypting process. The encrypting unit 15 encrypts information to be transmitted by using the hash function HF1 to generate encrypted information.

As shown in FIG. 1, the writing device 2 has a digest generating unit 21, a storing unit 22, a hash function encrypting unit 23, a dummy value generating unit 24, a selector 25, and a buffer 26.

The digest generating unit 21 generates the digest value DI from the unique code UC by the same algorithm as that of the digest generating unit 11. The unique code UC which is input to the digest generating unit 21 is the same as that which is input to the digest generating unit 11, and is transmitted from the semiconductor device 1. That is, the digest value DI generated in the digest generating unit 21 becomes the same as the digest value DI generated by the digest generating unit 11 in the semiconductor device 1.

In the storing unit 22, confidential information (for example, the hash function HF1) used as an encryption key in the semiconductor device 1 is stored. The hash function encrypting unit 23 reads the hash function HF1 from the storing unit 22 and generates the specific information HF2 obtained by encrypting the hash function HF1 with the unique code UC.

The dummy value generating unit 24 generates the dummy value Dd to be written in the memory region 12 of the semiconductor device 1 together with the specific information HF2. The dummy value Dd is, for example, information given by a random number generator or the like and is fake information obtained by encrypting a value different from the hash function HF1.

The selector 25 is a circuit for selecting information to be written in the buffer 26. The buffer 26 is a storage device temporarily storing the dummy value Dd and the specific information HF2. The buffer 26 is, for example, a nonvolatile memory such as a DRAM (Dynamic Random Access Memory). The buffer 26 is, preferably, a storage device having the same capacity as that of the memory region 12 of the semiconductor device 1.

More concretely, the selector 25 writes information into the buffer 26 by the same algorithm as that of performing reading operation using the digest value DI by the memory controller 13 of the semiconductor device 1. For example, in the writing device 2 according to the first embodiment, the selector 25 writes the specific information HF2 in a region corresponding to the address indicated by the digest value DI in the region of the buffer 26, and writes the dummy value Dd in a region indicated by another address in the buffer 26. The writing device 2 issues an instruction of merging the information stored in the buffer 26 and transmitting the merged information to the semiconductor device 1.

Figure 2:
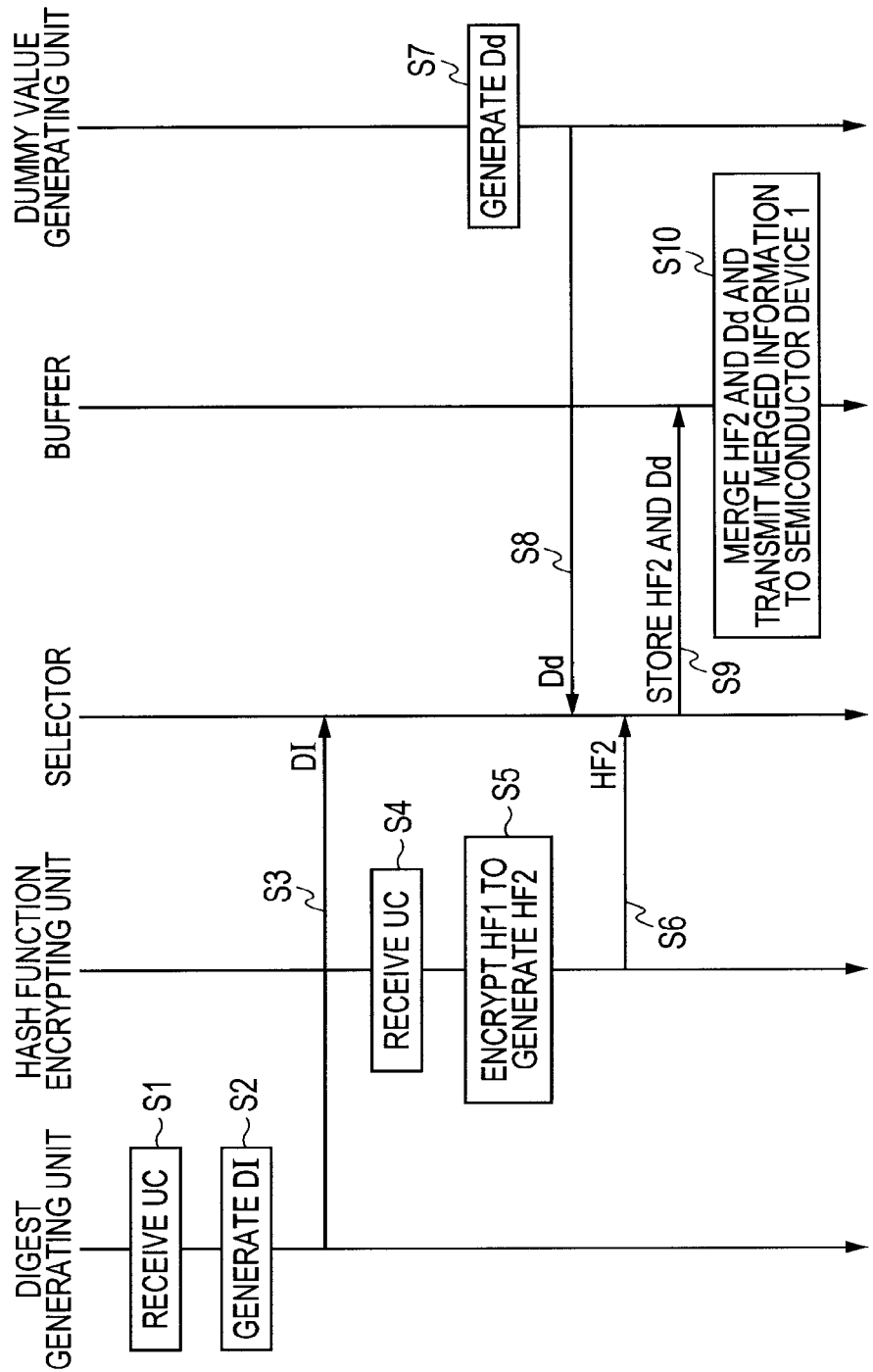
FIG. 2 is a sequence diagram showing the operation procedure of the writing device in the first embodiment.

The operation of the writing device 2 according to the first embodiment will now be described in detail. FIG. 2 is a sequence diagram showing the operation procedure of the writing device 2.

As shown in FIG. 2, first, the writing device 2 receives the unique code UC in the digest generating unit 21 (step S1). The digest generating unit 21 generates the digest value DI (step S2). The digest value is sent to the selector 25 (step S3).

Subsequently, the writing device 2 receives the unique code UC in the hash function encrypting unit 23 (step S4). The hash function encrypting unit 23 encrypts the hash function HF1 with the unique code UC to generate the specific information HF2 (step S5). The specific information HF2 is transmitted to the selector 25 (step S6).

The writing device 2 generates the dummy value Dd in the dummy value generating unit 24 (step S7). The dummy value Dd is transmitted to the selector 25 (step S8). The dummy value is generated so as to fill the buffer region other than the specific information HF2. With respect to the generation, a dummy value made of small number of bits may be generated a plurality of times, or the dummy value may be generated at once.

The selector 25 writes the received specific information HF2 in the region using the digest value DI as an address in the buffer 26, and writes the dummy value Dd in the other region of the buffer 26 (step S9). The writing device 2 merges the specific information HF2 and the dummy value Dd stored in the buffer 26 and transmits the merged information to the semiconductor device 1 (step S10).

As a result, in the memory region 12 of the semiconductor device 1, the specific information HF2 is stored in the region using the digest value DI as the address, and the dummy value Dd is stored in the other region.

Figure 3:
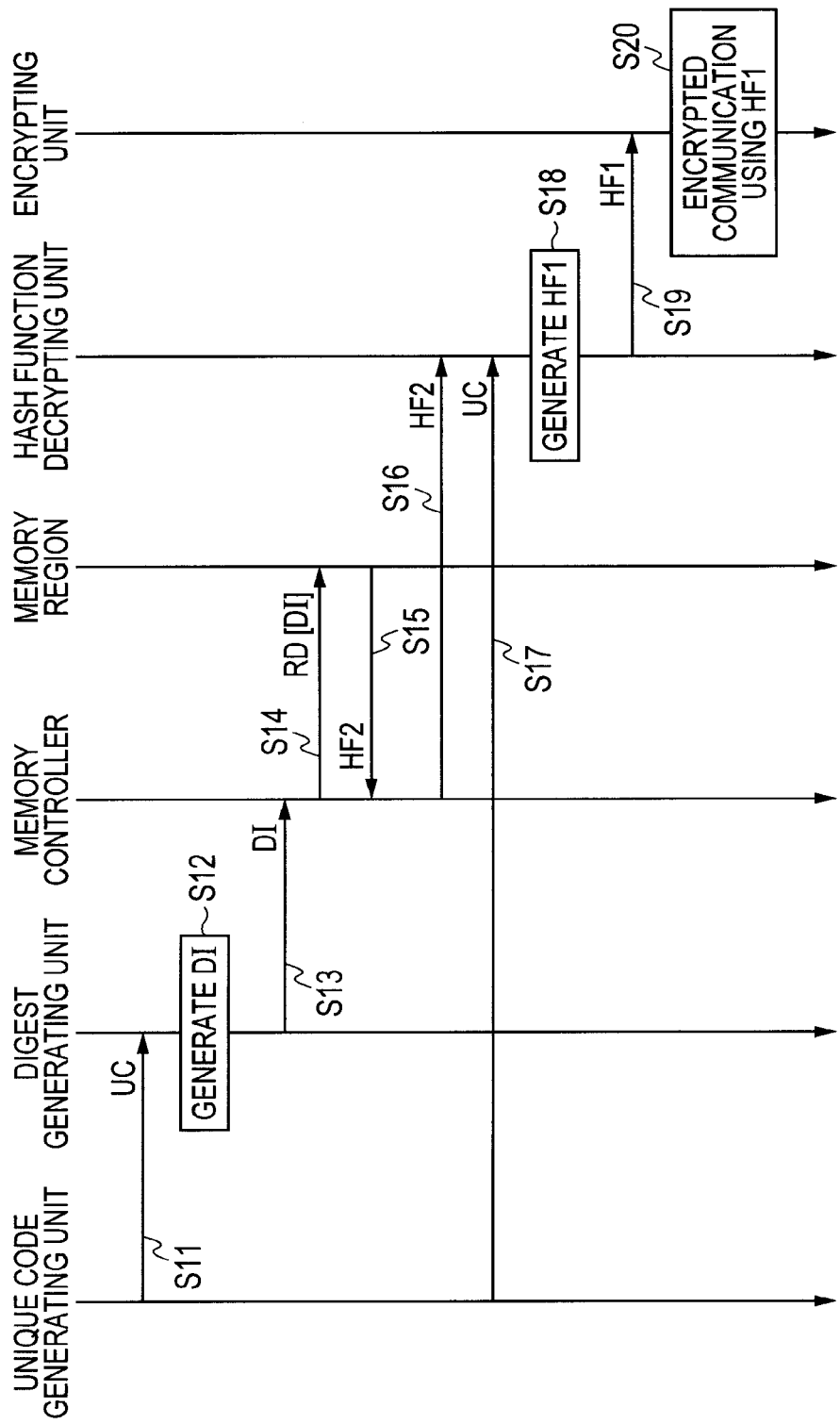
FIG. 3 is a sequence diagram showing the operation procedure of the semiconductor device according to the first embodiment using specific information.

Subsequently, the operation of the semiconductor device 1 using the specific information HF2 will be described. FIG. 3 is a sequence diagram showing the operation procedure of the semiconductor device according to the first embodiment using specific information HF2.

As shown in FIG. 3, first, the semiconductor device 1 sends the unique code UC generated by the unique code generating unit 10 to the digest generating unit 11 and the hash function decrypting unit 14 (steps S11 and S17). Next, the digest generating unit 11 generates the digest value DI on the basis of the received unique code UC (step S12). The digest value DI is transmitted to the memory controller 13 (step S13).

The memory controller 13 uses the received digest value DI as a read address and issues a read instruction RD [DI] (step S14). From the memory region 12, the specific information HF2 stored in the address associated with the digest value DI is transmitted to the memory controller 13 in accordance with the read instruction RD[DI] (step S15). Subsequently, the memory controller 13 transmits the received specific information HF2 to the hash function decrypting unit 14 (step S16).

The hash function decrypting unit 14 decrypts the received specific information HF2 with the received unique code UC to generate the hash function HF1 (step S18). The hash function HF1 is transmitted to the encrypting unit 15 (step S19). The semiconductor device 1 starts the encrypted communication by using the hash function HF1 (step S20).

Methods of analyzing a general semiconductor device and illegally obtaining data include: (1) a method of processing a semiconductor device with an FIB (Focused Ion Beam) and physically analyzing the semiconductor device with a probe, (2) a fault tree analysis of illegally obtaining data by making a CPU run away by irradiating a semiconductor device with an electromagnetic wave such as a laser beam and inserting noise in a power supply terminal, (3) a leak analysis of analyzing key data by observing consumption current amount of the semiconductor device, and (4) a method of directly coupling to a signal terminal of a semiconductor device and reading signal information.

To avoid such illegal analysis, in fields requiring high security level, a microcomputer having high security level (hereinbelow, called secure microcomputer) is used. The secure microcomputer is provided with a shield against a wiring region, a function of detecting light and signal noises, a function of scattering current by combining a random number signal with a signal, and the like.

As described above, by using a secure microcomputer, illegal analysis on a semiconductor device by a third party can be prevented. However, in the case of using the secure microcomputer, although the illegal analysis can be prevented, problems occur such that a semiconductor device manufacturer and the like cannot perform a failure analysis and a breakdown analysis due to the tamper resistance characteristic. In particular, since an in-vehicle microcomputer (such as ECU) for use in a car needs high reliability, the failure analysis and the breakdown analysis on the semiconductor device are necessary. For such a reason, a general microcomputer (hereinbelow, called general microcomputer) whose security level is lower than that of a secure microcomputer is widely used as the in-vehicle microcomputer. However, in recent years, cases of attacks that target on the vulnerability of security of an in-vehicle microcomputer are reported. Therefore, for an in-vehicle microcomputer, an encrypted communication system with improved security level of a semiconductor device while using a general microcomputer is in demand.

In the semiconductor device according to the first embodiment, the encrypted specific information HF2 is stored in a region associated with unique code correspondence information (for example, the digest value DI) generated from the unique code UC. Accordingly, in the semiconductor device 1, the specific information HF2 is stored in a region which varies among devices. Consequently, the region itself storing the specific information HF2 can be kept confidential from an attacker. Therefore, in the semiconductor device 1 according to the first embodiment, the security of the specific information HF2 stored in the semiconductor device 1 can be improved. In the semiconductor device 1 according to the first embodiment, without using the secure microcomputer, security can be improved.

In the semiconductor device 1 according to the first embodiment, the specific information HF2 is stored in a memory region as a region which can be accessed from the CPU (Central Processing Unit) or the like. However, the specific information HF2 stored is information encrypted with the unique code UC unique to a device. In the semiconductor device 1 according to the first embodiment, the hash function HF1 is generated each time as necessary. Consequently, at the time of maintenance or the like, a maintenance person having the encryption key corresponding to the hash function HF1 as the original information of the specific information HF2 can analyze something wrong with the hash function HF1. On the other hand, even in the case where the attacker can read the specific information HF2, the attacker cannot understand the algorithm by which the specific information HF2 is encrypted and cannot decrypt the hash function HF1 from the specific information HF2. That is, the semiconductor device 1 according to the first embodiment can improve security without sacrificing the maintenance performance on the hash function HF1 as confidential information.

The semiconductor device 1 according to the first embodiment generates the specific information HF2 by encrypting the hash function HF1 using the unique code UC of the device itself. Consequently, in the semiconductor device 1 according to the first embodiment, at the time of decrypting the specific information HF2, it is sufficient to use only the unique code UC, and it is unnecessary to obtain an encryption key used for decryption by coupling to a database of a server or the like. That is, the semiconductor device 1 according to the first embodiment does not need a security measure for coupling to a server or the like.

Further, in the semiconductor device 1 according to the first embodiment, it is unnecessary to assure more than the capacity of the buffer 26 of the writing device 2 as the capacity of the memory region storing the specific information HF2. Consequently, in the semiconductor device 1 according to the first embodiment, the memory region provided in the semiconductor device 1 can be used effectively.

In the first embodiment, the dummy value and the specific information HF2 are written in a merged stage from the writing device 2 to the semiconductor device 1. Consequently, even when an attack such as a side channel attack is made on a communication path extending from the writing device 2 to the semiconductor device 1, the attacker cannot distinguish between the dummy value and the specific information HF2. At the time of transmitting information of the hash function HF1 from the writing device 2 to the semiconductor device 1, the hash function HF1 is encrypted as the specific information HF2. Even if the attacker can determine the specific information HF2, as long as the encryption algorithm is unknown, the hash function HF1 cannot be obtained by the attacker. Also from such a viewpoint, the semiconductor device 1 according to the first embodiment and the writing device 2 can improve the security on the hash function HF1 as confidential information.

Second Embodiment

Figure 4:
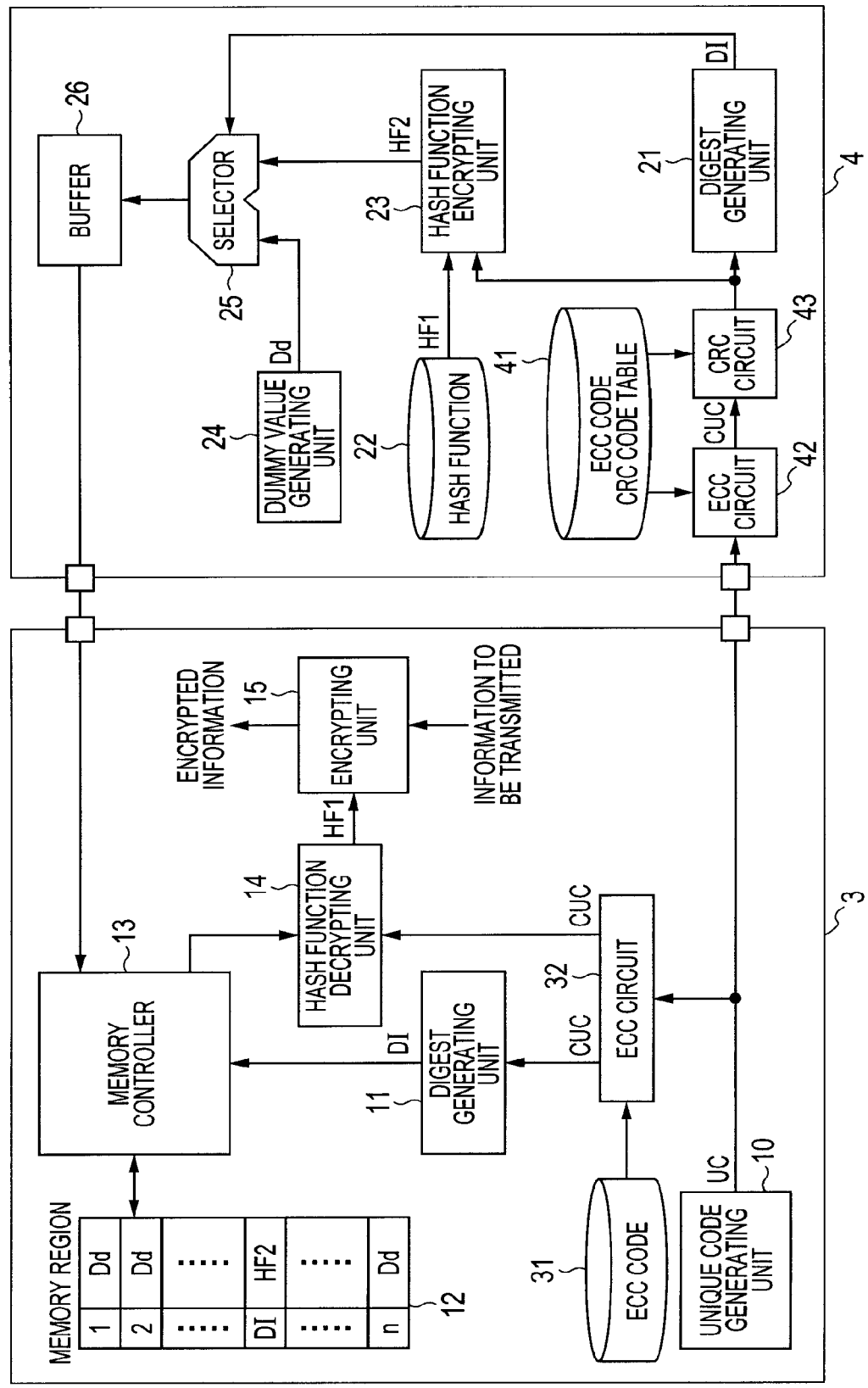
FIG. 4 is a block diagram of a semiconductor device according to a second embodiment and a writing device of writing specific information to the semiconductor device.

FIG. 4 is a block diagram of a semiconductor device 3 according to a second embodiment and a writing device 4 of writing specific information to the semiconductor device 3. As illustrated in FIG. 4, the semiconductor device 3 is obtained by adding a storing unit 31 storing data used for error correction of a unique code which is unique to a device, and an error correcting circuit (for example, an ECC circuit 32) to the semiconductor device 1 according to the first embodiment. The writing device 4 is obtained by adding, to the writing device 2 of the first embodiment, a storing unit 41 storing data (for example, ECC code) used for error correction on the unique code of the device and data (for example, CRC code table) for comparing and validating the unique code of the device on which the error code is performed, an error correction circuit (for example, an ECC circuit 42), and a CRC circuit 43 for comparing and validating the unique code.

The ECC circuit 32 of the semiconductor device 3 corrects an error included in a unique code UC generated by the unique code generating unit 10 to generate a corrected unique code CUC. More concretely, the ECC circuit 32 reads an ECC code corresponding to the unique code UC from the storing unit 31 and corrects an error in the unique code UC on the basis of the ECC code to generate the error-corrected unique code CUC.

In the semiconductor device 3, on the basis of the error-corrected unique code CUC, the digest generating unit 11 generates the digest value DI. In the semiconductor device 3, the hash function decrypting unit 14 performs decrypting process on the basis of the error-corrected unique code CUC.

The ECC circuit 42 in the writing device 4 corrects an error included in a unique code UC generated by the unique code generating unit 10 to generate a corrected unique code CUC. More concretely, the ECC circuit 42 reads an ECC code corresponding to the unique code UC from the storing unit 41 and corrects an error in the unique code UC on the basis of the ECC code to generate the error-corrected unique code CUC. The ECC code stored in the storing unit 41 is the same as that stored in the storing unit 31 in the semiconductor device 3. In the case where the same ECC code is held in the two devices, validity of the writing device 4 and the semiconductor device 3 can be confirmed.

The CRC circuit 43 in the writing device 4 compares the error-corrected unique code CUC with the CRC code table stored in the storing unit 41 to determine validity of the error-corrected unique code CUC. The CRC code table is data of a table recording a valid unique code associated with an ECC code. In the case where the CRC circuit 43 determines that the error-corrected unique code CUC is valid, it supplies the error-corrected unique code CUC to the digest generating unit 21 and the hash function encrypting unit 23. On the other hand, in the case where the CRC circuit 43 determines that the error-corrected unique code CUC is invalid, the writing device 4 stops the process of writing the hash function HF1.

Figure 5:
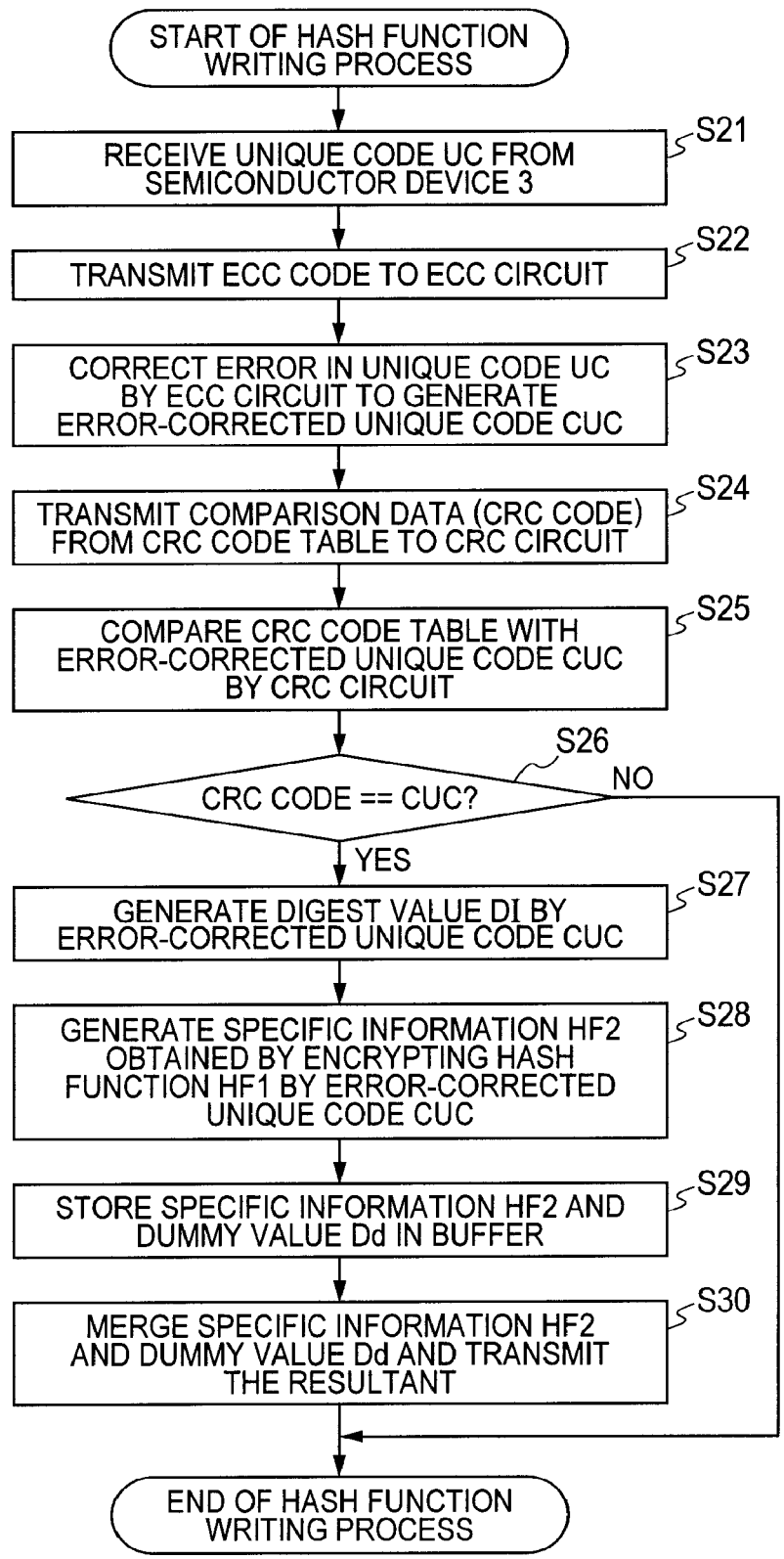
FIG. 5 is a flowchart showing the operation of the writing device according to the second embodiment.

The operation of the writing device 4 according to the second embodiment will now be described. FIG. 5 is a flowchart showing the operation of the writing device 4 according to the second embodiment.

First, the writing device 4 receives the unique code UC which is uncorrected from the semiconductor device 3 (step S21). Subsequently, the writing device 4 transmits an ECC code from the storing unit 41 to the ECC circuit 42 (step S22). The ECC circuit 42 corrects an error in the unique code UC which is uncorrected to generate an error-corrected unique code CUC (step S23).

The writing device 4 transmits a CRC code table from the storing unit 41 to the CRC circuit 43 (step S24). The writing device 4 compares the CRC code table with the error-corrected unique code CUC in the CRC circuit 43 (step S25). In the case where the CRC code and the error-corrected unique code CUC do not match in the comparison in step S25 (NO in step S26), the writing device 4 stops the process of writing the specific information HF2. On the other hand, in the case where the CRC code and the error-corrected unique code CUC match (YES in step S26), the writing device 4 carries forward the process of writing the specific information HF2.

In the case where it is determined in step S26 that the CRC code and the error-corrected unique code CUC match, the writing device 4 generates the digest value DI on the basis of the error-corrected unique code CUC (step S27). Subsequent to step S27, the writing device 4 encrypts the hash function HF1 with the error-corrected unique code CUC to generate specific information HF2 (step S28).

The writing device 4 stores the specific information HF2 and the dummy value Dd in the buffer 26 (step S29). More concretely, in step S29, the specific information HF2 is stored in a region whose address is the digest value DI in the region of the buffer 26 and stores the dummy value Dd in a region whose address is not the digest value DI in the region of the buffer 26. Subsequently, the writing device 4 merges the specific information HF2 and the dummy value Dd and sends the merged to the semiconductor device 3 (step S30).

In the flowchart of FIG. 5, when it is determined by the CRC circuit 43 that the error-corrected unique code CUC is not a regular one, the writing device 4 does not transmit the specific information HF2 to the semiconductor device 3. Using this method and the CRC code, in the case such that the semiconductor device 3 is not a regular one, the specific information HF2 can be prevented from being transmitted to the irregular semiconductor device 3.

Figure 6:
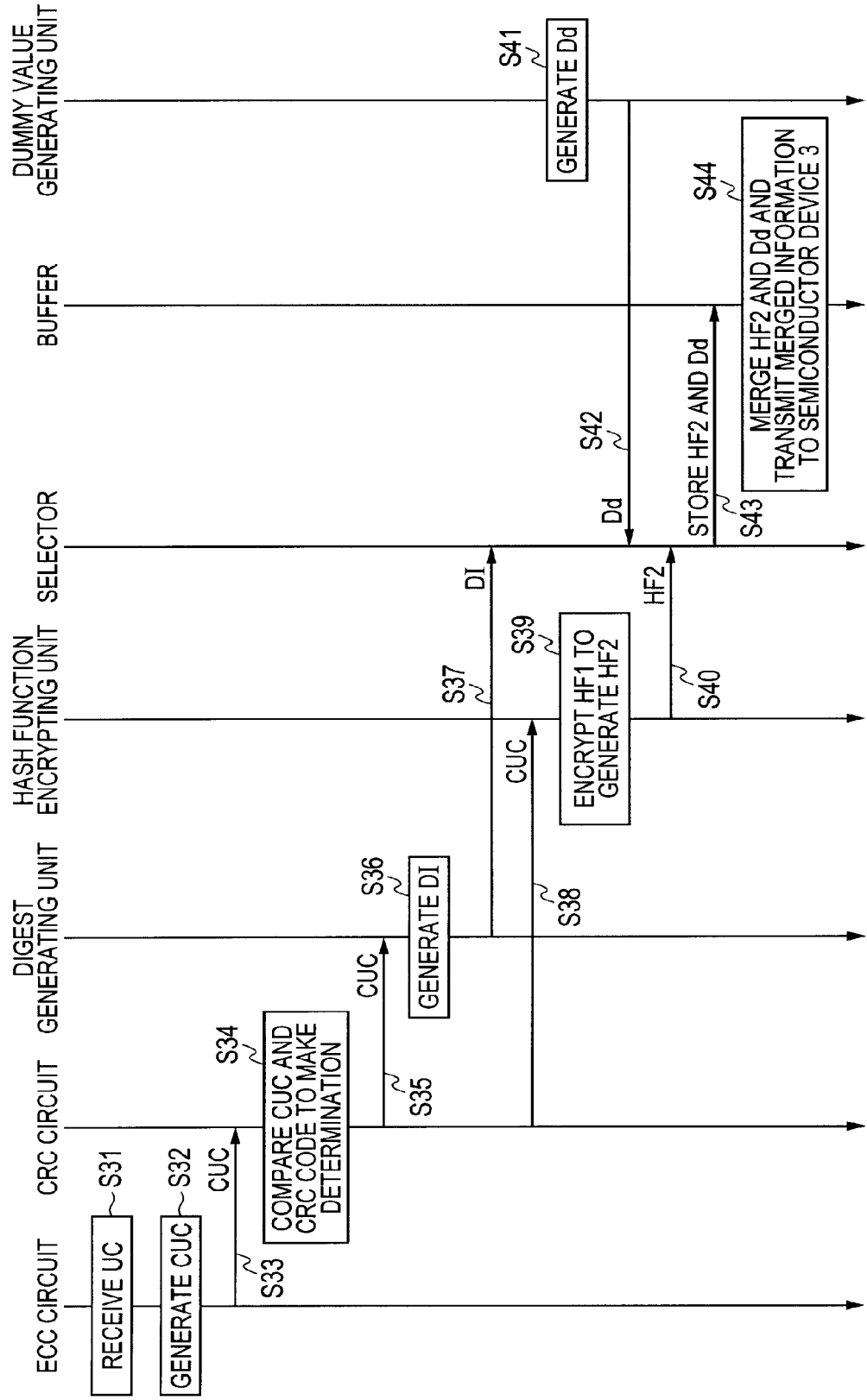
FIG. 6 is a sequence diagram showing the operation procedure of the writing device according to the second embodiment.

FIG. 6 is a sequence diagram showing the operation procedure of the writing device 4 according to the second embodiment. As illustrated in FIG. 6, first, the writing device 4 receives the unique code UC which is uncorrected from the semiconductor device 3 (step S31). Subsequently, the writing device 4 corrects an error in the unique code UC by using the ECC code in the ECC circuit 42 to generate an error-corrected unique code CUC (step S32). The error-corrected unique code CUC is transmitted to the CRC circuit 43 (step S33).

In the writing device 4, the CRC circuit 43 applies a corresponding CRC code from the CRC code table 41, compares the error-corrected unique code CUC with the CRC code, and determines validity of the error-corrected unique code CUC (step S34). In the case where it is determined in step S34 that the error-corrected unique code CUC is invalid, the process is stopped. On the other hand, when it is determined in step S34 that the error-corrected unique code CUC is valid, the process is continued.

Following the process in step S34, generation of the specific information HF2 and the dummy value Dd and transmission of the specific information HF2 and the dummy value Dd is performed. Concretely, in the writing device 4, the error-corrected unique code UC is transmitted from the CRC circuit 43 to the digest generating unit 21 and the hash function encrypting unit 23 (steps S35 and S38). The digest generating unit 21 generates the digest value DI on the basis of the error-corrected unique code CUC (step S36). The digest value DI is transmitted to the selector 25 (step S37).

Subsequently, the writing device 4 encrypts the hash function HF1 with the error-corrected unique code UC to generate the specific information HF2 in the hash function encrypting unit 23 (step S39). The specific information HF2 is transmitted to the selector 25 (step S40).

The writing device 4 generates the dummy value Dd in the dummy value generating unit 24 (step S41). The dummy value Dd is transmitted to the selector 25 (step S42). The dummy value Dd is generated so that the buffer region except for the specific information HF2 is occupied. The dummy value Dd of small number of bits can be generated a plurality of times, or the dummy value Dd can be generated at once.

The selector 25 writes the received specific information HF2 to the region whose address is the digest value DI in the buffer 26 and writes the dummy value Dd in the other region in the buffer 26 (step S43). The writing device 4 merges the specific information HF2 and the dummy value Dd stored in the buffer 26 and transmits the merged to the semiconductor device 3 (step S44).

Figure 7:
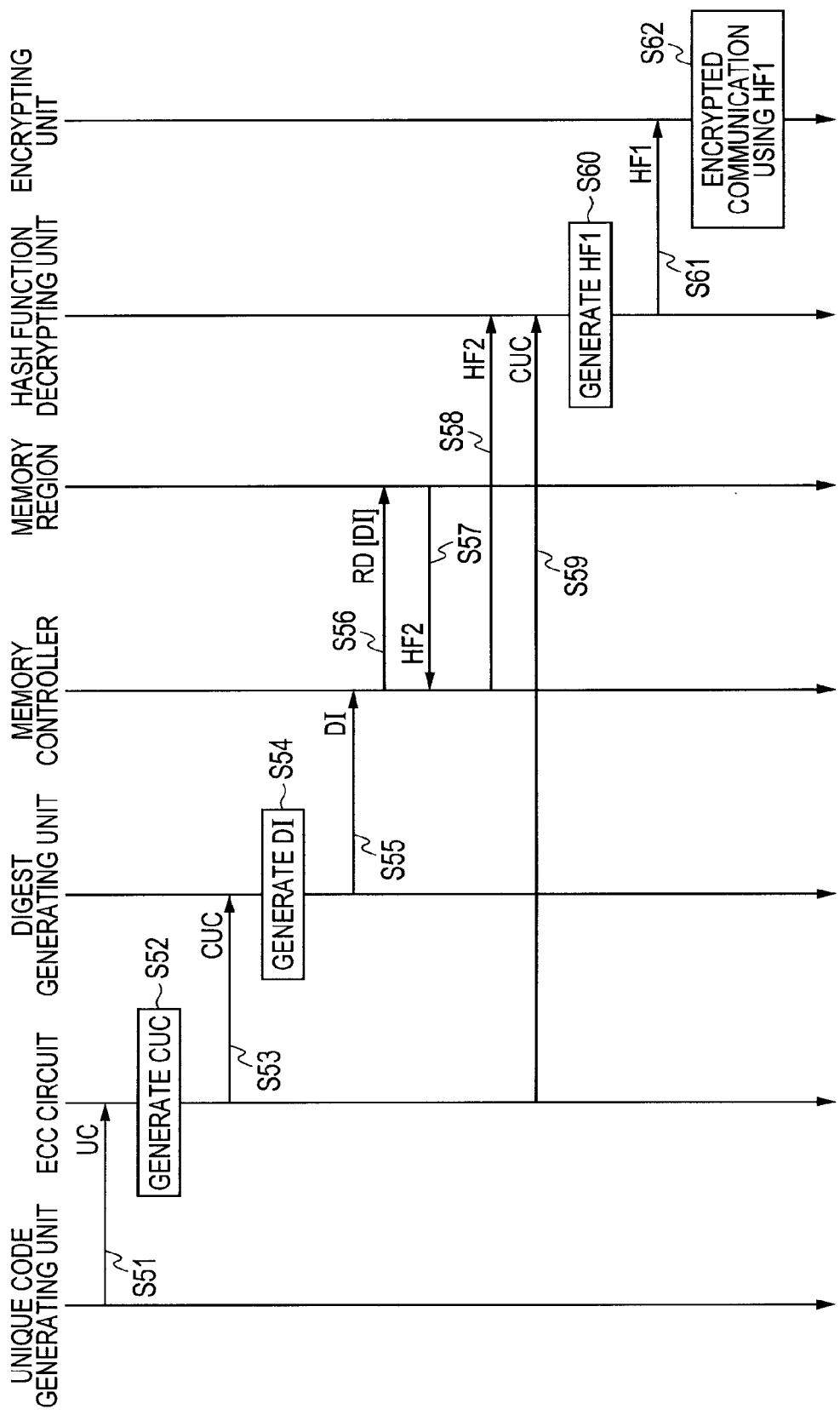
FIG. 7 is a sequence diagram showing the operation procedure of the semiconductor device according to the second embodiment using specific information.

Subsequently, the operation of the semiconductor device 3 using the specific information HF2 will be described. FIG. 7 is a sequence diagram showing the operation procedure of the semiconductor device according to the third embodiment using specific information HF2.

As shown in FIG. 7, first, the semiconductor device 1 sends an uncorrected unique code UC generated by the unique code generating unit 10 to the ECC circuit 32 (step S51). The ECC circuit 32 reads the ECC code from the storing unit 31 and corrects an error in the unique code UC to generate the error-corrected unique code UCU (step S52). The ECC circuit 32 transmits the error-corrected unique code CUC to the digest generating unit 11 and the hash function decrypting unit 14 (steps S53 and S59). Subsequently, the digest generating unit 11 generates the digest value DI on the basis of the received error-corrected unique code CUC (step S54). The digest value DI is transmitted to the memory controller 13 (step S55).

The memory controller 13 uses the received digest value DI as a read address and issues a read instruction RD [DI] (step S56). From the memory region 12, the specific information HF2 stored in the address associated with the digest value DI is transmitted to the memory controller 13 in accordance with the read instruction RD[DI] (step S57). Subsequently, the memory controller 13 transmits the received specific information HF2 to the hash function decrypting unit 14 (step S58).

The hash function decrypting unit 14 decrypts the received specific information HF2 with the received error-corrected unique code CUC to generate the hash function HF1 (step S60). The hash function HF1 is transmitted to the encrypting unit 15 (step S61). The semiconductor device 1 starts the encrypted communication by using the hash function HF1 (step S62).

As described above, by providing the error correcting circuit (for example, the ECC circuit 32), even when the unique code UC is, for example, a PUF including an error in random bits due to the generation principle, the semiconductor device 3 according to the second embodiment can perform operation similar to that of the semiconductor device 1 according to the first embodiment by using the corrected unique code CUC which is obtained by correcting the error. The PUF is a value unique to a device and even when the circuit is the same, codes having the same value cannot be generated. Consequently, by using the PUF, security can be improved.

Since it is unnecessary to transmit/receive the ECC code for generating the unique code UC by the semiconductor device 3 and the writing device 4 at the time of generation of the unique code, confidentiality of the ECC code is kept. Since the writing device 4 has the same ECC code as that stored in the storing unit 31 of the semiconductor device 3, validity of the semiconductor device 3 for the writing device 4 or validity of the writing device 4 for the semiconductor device 3 can be determined. In the case where any one of the writing device 4 and the semiconductor device 3 is invalid, the ECC code stored in the semiconductor device 3 and the ECC code stored in the writing device 4 do not match. On the other hand, the unique code UC to be subjected to error correction in the semiconductor device 3 and that in the writing device 4 are the same. In the case of applying different ECC codes to the same unique code, an appropriate error correction is not made. Consequently, the error-corrected unique code CUC on which an error correction different from the original error correction is performed has a value different from the value in the CRC code table. That is, the writing device 4 according to the second embodiment can determine the validity of the semiconductor device 3 or the validity of the writing device 4 to the semiconductor device 3 by CRC process in the CRC circuit 43.

Further, in the writing device 4 according to the second embodiment, in the case where validity of any one of the semiconductor device 3 and the writing device 4 is suspected, the generating process and the transmitting process of the specific information HF2 are stopped. Accordingly, the writing device 4 according to the second embodiment can prevent the specific information HF2 (and the hash function HF1) from being leaked to the invalid semiconductor device 3 (such as an imitation). That is, the writing device 4 according to the second embodiment can improve security to the semiconductor device 3.

Although the CRC circuit 43 is used to confirm validity of the error-corrected unique code CUC in the second embodiment, the validity of the error-corrected unique code CUC can be confirmed, not necessarily by the CRC circuit, but by another circuit as long as the circuit has the function capable of detecting an error in a parity or the like and preventing erroneous correction.

The semiconductor device 3 according to the second embodiment transmits a code to be subjected to error correction as the unique code UC transmitted to the writing device 4. That is, in the communication path between the semiconductor device 3 and the writing device 4, the unique code UC including an error is transmitted. Consequently, in the semiconductor device 3 according to the second embodiment, the unique code UC which is tapped also in the case where an attack such as a side channel attack is made on the communication path includes an error, so that the attacker cannot determine the valid unique code UC from the tapped information. That is, by using the semiconductor device 3 according to the second embodiment, the security of the communication path can be improved.

Third Embodiment

Figure 8:
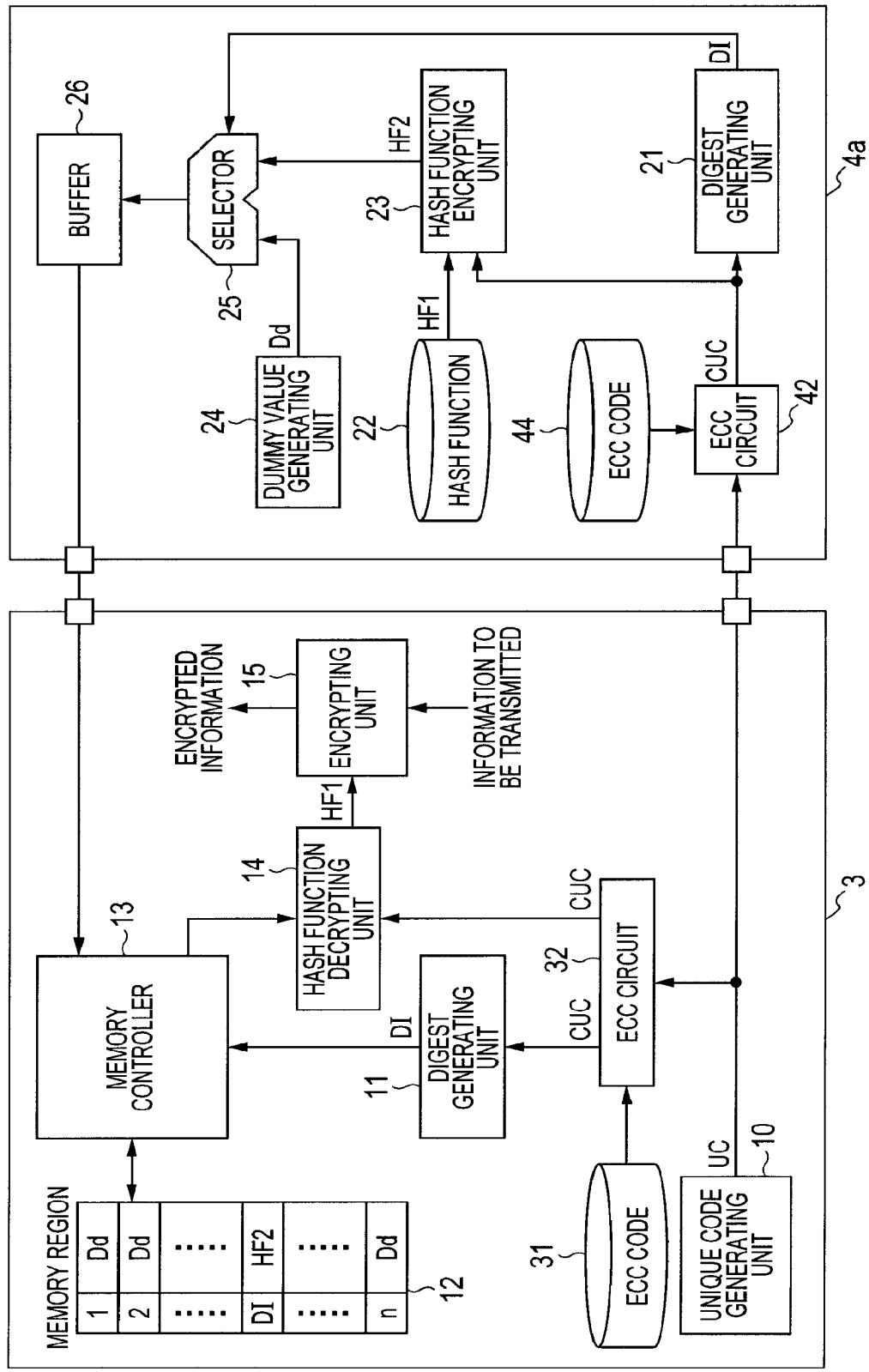
FIG. 8 is a block diagram of a semiconductor device according to a third embodiment and a writing device of writing specific information to the semiconductor device.

FIG. 8 is a block diagram of a semiconductor device 3 according to a third embodiment and a writing device 4a of writing specific information to the semiconductor device 3. As shown in FIG. 8, in the third embodiment, a configuration having the writing device 4a obtained by excluding a CRC circuit from the writing device 4 according to the second embodiment will be described.

As illustrated in FIG. 8, in the writing device 4a, without the CRC process performed by the CRC circuit, the error-corrected unique code CUC is transmitted to the digest generating unit 21 and the hash function encrypting unit 23. As described above, the difference between the semiconductor device 3 and the writing device 4a in the third embodiment and the semiconductor device 3 and the writing device 4 in the second embodiment is only the presence/absence of the CRC circuit. Consequently, only the operation of the writing device 4a will be described below.

Figure 9:
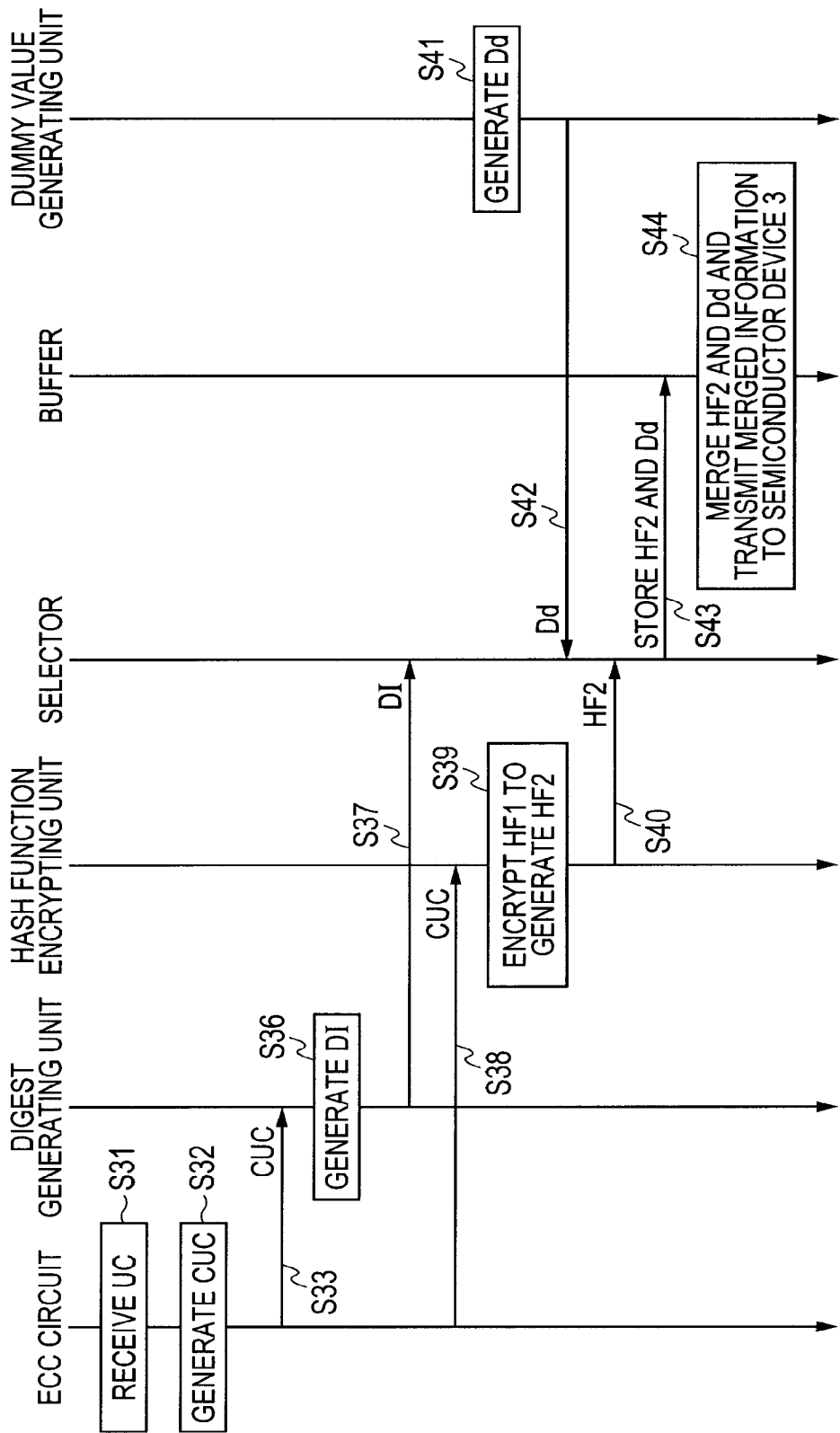
FIG. 9 is a sequence diagram showing the operation procedure of the writing device according to the third embodiment.

FIG. 9 is a sequence diagram showing the operation procedure of the writing device 4a according to the third embodiment. In FIG. 9, to make the operation of the writing device 4a correspond to that of the writing device 4, the same reference numerals are designated to operations substantially the same as those of the writing device 4.

As illustrated in FIG. 9, first, the writing device 4a receives the unique code UC to be subjected to error correction from the semiconductor device 3 (S31). Subsequently, the ECC circuit 42 corrects an error in the unique code UC by using the ECC code to generate the error-corrected unique code CUC (step S32). The error-corrected unique code CUC is transmitted to the digest generating unit 21 and the hash function encrypting unit 23 (steps S35 and S38). The digest generating unit 21 generates the digest value DI on the basis of the error-corrected unique code CUC (step S36). The digest value DI is transmitted to the selector 25 (step S37).

Subsequently, the writing device 4a encrypts the hash function HF1 with the error-corrected unique code CUC by the hash function encrypting unit 23 to generate the specific information HF2 (step S39). The specific information HF2 is transmitted to the selector 25 (step S40).

The writing device 4 generates the dummy value Dd in the dummy value generating unit 24 (step S41). The dummy value Dd is transmitted to the selector 25 (step S42). The dummy value Dd is generated so as to fill the buffer region other than the specific information HF2. With respect to the generation, a dummy value made of small number of bits may be generated a plurality of times, or the dummy value may be generated at once.

The selector 25 writes the received specific information HF2 in the region using the digest value DI as an address in the buffer 26, and writes the dummy value Dd in the other region of the buffer 26 (step S43). The writing device 4 merges the specific information HF2 and the dummy value Dd stored in the buffer 26 and transmits the merged information to the semiconductor device 3 (step S44).

As described above, in the writing device 4a according to the third embodiment, without performing the CRC process by the CRC circuit, the specific information HF2 is written. Even in such a case, when any one of the semiconductor device 3 and the writing device 4a is invalid, the specific information HF2 written in the semiconductor device 3 cannot be read by the error-corrected unique code CUC of the semiconductor device 3. The reason is that the digest value DI generated by the writing device 4a and the digest value DI generated by the semiconductor device 3 are different values. In the semiconductor device 3, for example, even in the case where the specific information HF2 can be read from the memory region 12, since the error-corrected unique code CUC used for the generation of the specific information HF2 and the error-corrected unique code CUC generated by the semiconductor device 3 do not match, the hash function HF1 cannot be decrypted by the hash function decrypting unit 14.

Consequently, the semiconductor device 3 and the writing device 4a according to the third embodiment can decrypt the hash function HF1 only in the case where the devices are valid. In the case where any one of the semiconductor device 3 and the writing device 4a according to the third embodiment is invalid, decryption of the hash function HF1 can be prevented. That is, the semiconductor device 3 and the writing device 4a according to the third embodiment can realize high security without using the CRC circuit.

Fourth Embodiment

Figure 10:
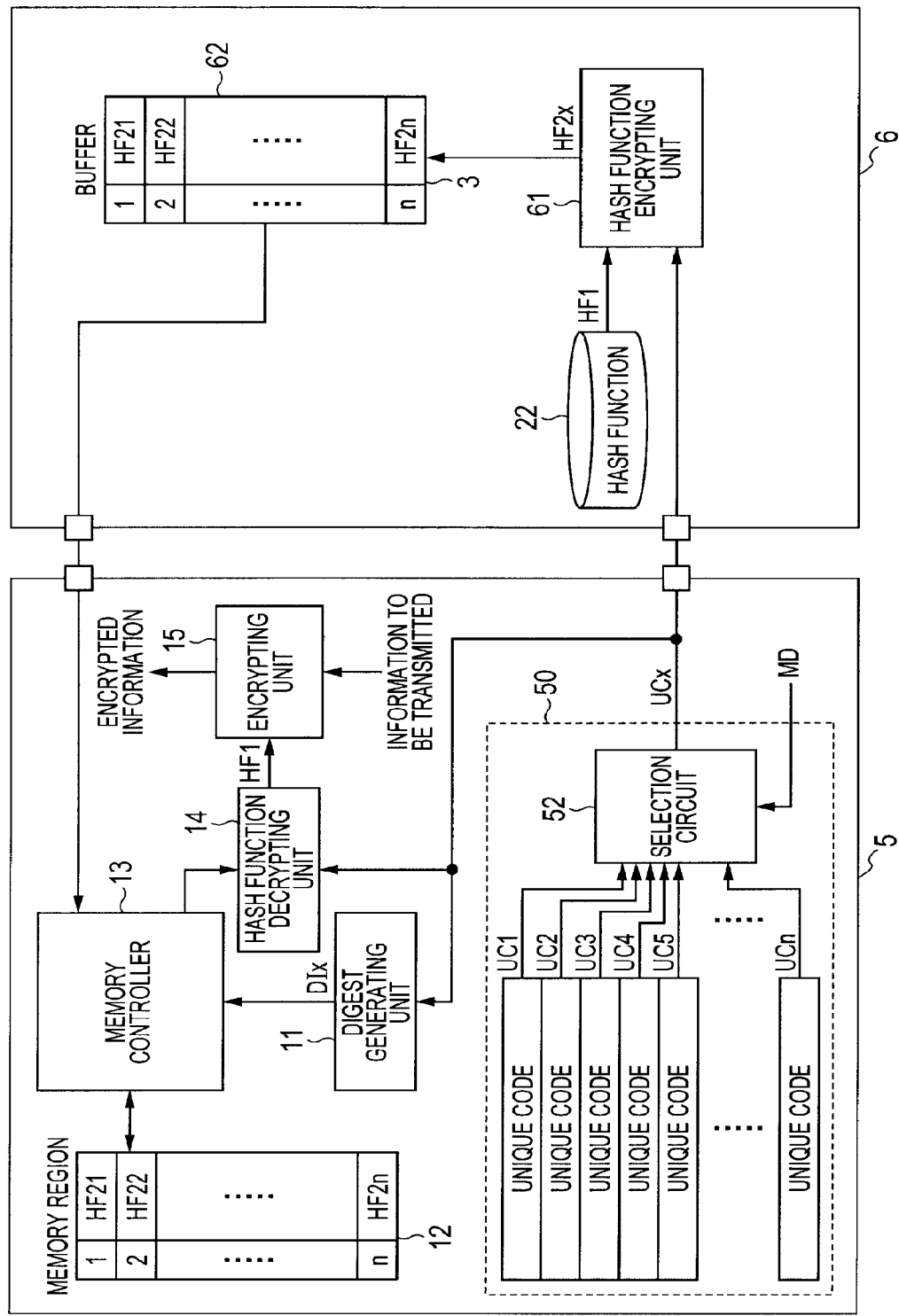
FIG. 10 is a block diagram of a semiconductor device according to a fourth embodiment and a writing device of writing specific information to the semiconductor device.

FIG. 10 is a block diagram of a semiconductor device 5 and a writing device 6 according to a fourth embodiment. As shown in FIG. 10, the semiconductor device 5 has a unique code generating unit 50 in place of the unique code generating unit 10 of the semiconductor device 1 according to the first embodiment. In the semiconductor device 5, in the memory region 12, the dummy value Dd is not stored but specific information HF21 to HF2$n$ ($n$ denotes a value indicative of the number of pieces of specific information stored) is stored.

The unique code generating unit 50 generates a plurality of unique codes UC1 to UCn ($n$ denotes a value indicative of the number of unique codes generated), and selects one unique code UCx (x denotes a value indicative of the number of the selected unique code) from the unique codes UC1 to UCn. The unique code generating unit 50 gives the selected unique code UCx to the digest generating unit 11 and the hash function decrypting unit 14.

More concretely, the unique code generating unit 50 has the unique codes UC1 to UC*n* and a selection circuit 52. The unique code is configured by, for example, a PUF such as an initial value of an SRAM circuit. The selection circuit 52 selects any one of the unique codes UC1 to UC*n* and outputs it as the unique code UCx. The selection circuit 52 receives a mode signal MD. In the case where the mode signal MD indicates a normal operation mode, the selection circuit 52 outputs the arbitrary unique code UCx selected from the unique codes UC1 to UC*n*. At this time, the selection circuit 52 selects a unique code at random each time a unique code to be selected is requested. On the other hand, in the case where the mode signal MD indicates a writing mode, the selection circuit 52 sequentially selects the unique code UC*n* from the unique code UC1 and outputs it.

The writing device 6 has the storing unit 22, a hash function encrypting unit 61, and a buffer 62. The hash function encrypting unit 61 encrypts the hash function HF1 with the unique code sequentially transmitted from the semiconductor device 5 to sequentially generate the specific information HF21 to HF2*n*, and stores the specific information HF21 to HF2*n* into the buffer 62. That is, the specific information HF2*n* is obtained by encrypting the hash function HF1 with the unique code UC*n*. The specific information HF21 to HF2*n* is stored in the buffer 62. The writing device 6 merges the specific information HF21 to HF2*n* stored in the buffer 62 and transmits the merged information to the semiconductor device 5.

In the semiconductor device 5, the specific information HF21 to HF2*n* transmitted from the writing device 6 is stored in the memory region 12. In the semiconductor device 5, the digest values DI1 to DI*n* corresponding to the unique codes UC1 to UC*n* are generated, and the specific information HF21 to HF2*n* is stored in the region whose address is the digest value corresponding to the unique code used for the encrypting process. That is, in the memory region 12, the specific information HF21 to HF2*n* obtained by encrypting the hash function HF1 using a plurality of unique codes is stored in a plurality of regions associated with the unique codes UC1 to UC*n*. In FIG. 10, the digest value DIx is shown as one of the digest values DI1 to DI*n*.

Figure 11:
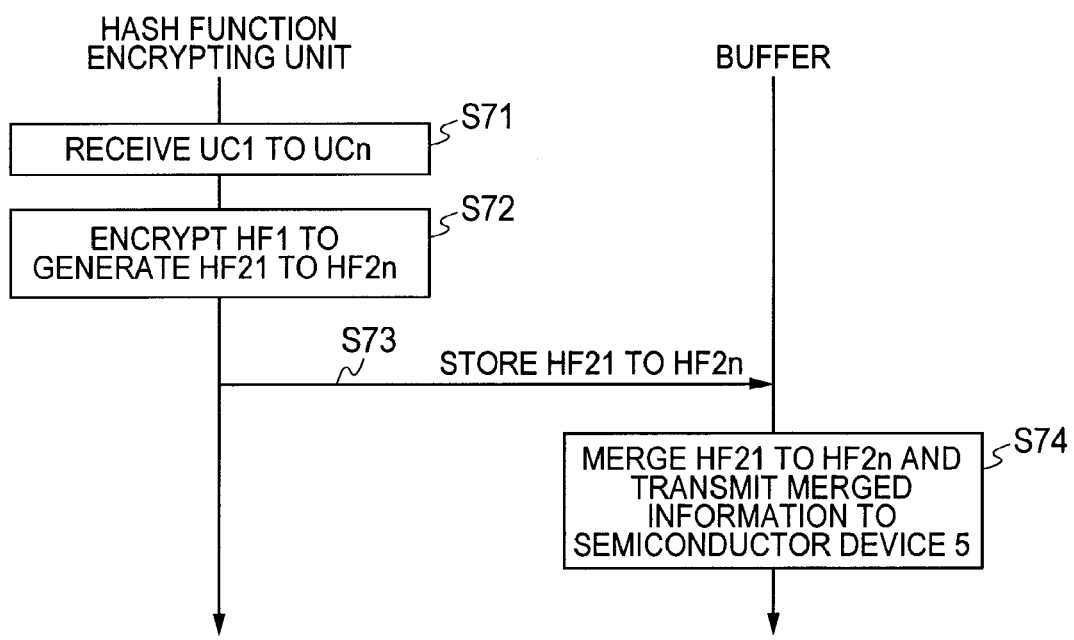
FIG. 11 is a sequence diagram showing the operation procedure of the writing device according to the fourth embodiment.

FIG. 11 is a sequence diagram showing the operation procedure of the writing device 6 according to the fourth embodiment. Referring to FIG. 11, the operation procedure of the device circuit 6 according to the fourth embodiment will be described.

As illustrated in FIG. 11, the hash function encrypting unit 61 in the writing device 6 receives the unique codes UC1 to UC*n* (step S71). The hash function encrypting unit 61 encrypts the hash function HF1 with the unique codes UC1 to UC*n* to generate specific information HF21 to HF2*n* (step S72). The specific information HF21 to HF2*n* is transmitted to the buffer 62 (step S73). The writing device 6 merges the specific information HF21 to HF2*n* stored in the buffer 62 and transmits the merged information to the semiconductor device 5 (step S74). In the semiconductor device 5, the specific information HF21 to HF2*n* is stored in a plurality of regions associated with the unique codes UC1 to UC*n* in the memory region 12.

Figure 12:
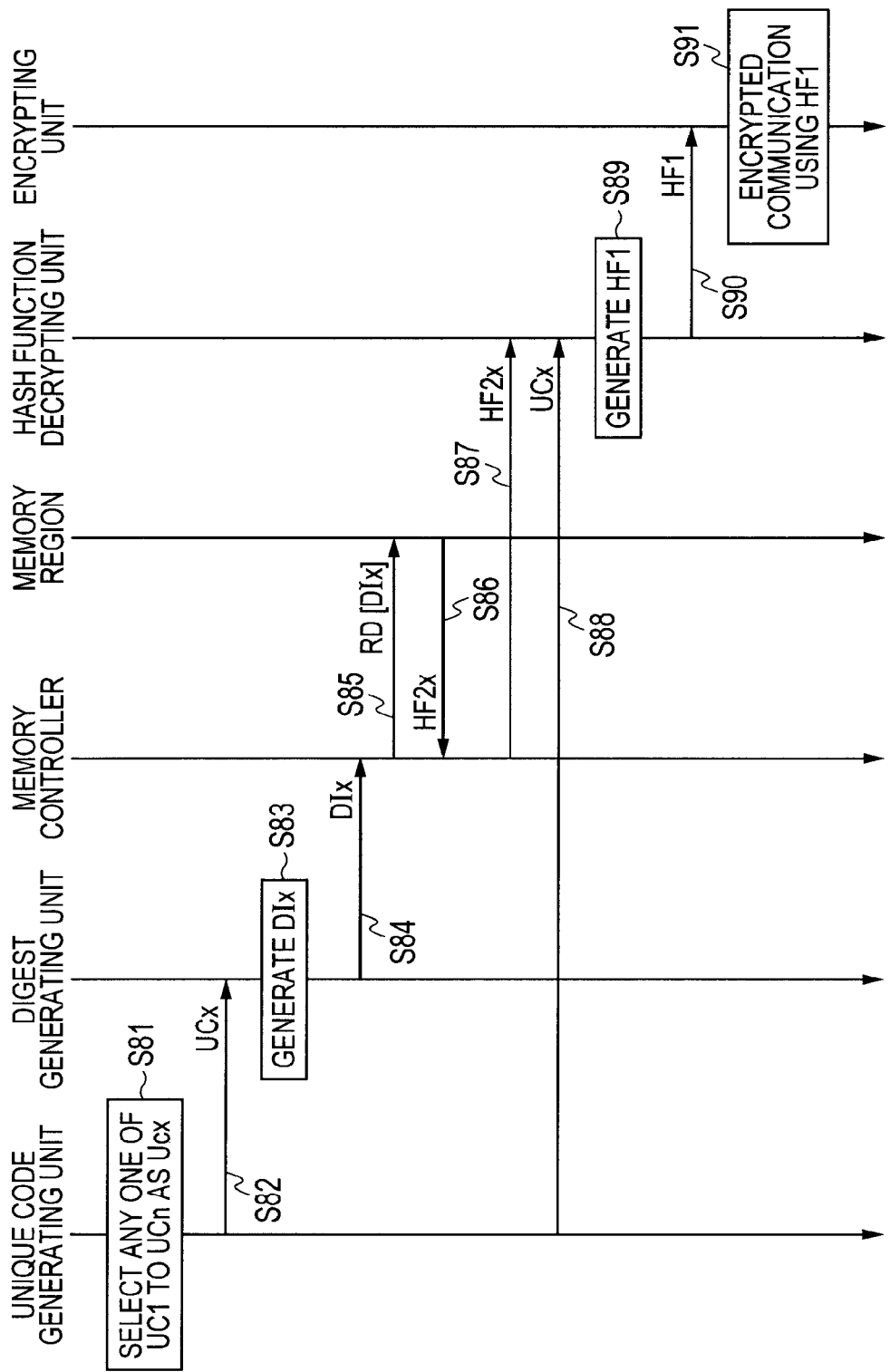
FIG. 12 is a sequence diagram showing the operation procedure of the semiconductor device according to the fourth embodiment using specific information.

The operation of the semiconductor device 5 using the specific information HF21 to HF2*n* will now be described. FIG. 12 is a sequence diagram showing the operation procedure of the semiconductor device 5 according to the fourth embodiment using the specific information HF21 to HF2*n*.

As illustrated in FIG. 12, the semiconductor device 5 outputs one of the unique codes UC1 to UC*n* generated by the unique code generating unit 10, which is selected at random, as the unique code UCx (step S81). The selected unique code UCx is transmitted to the digest generating unit 11 and the hash function decrypting unit 14 (steps S82 and S88). Subsequently, the digest generating unit 11 generates the digest value DIx on the basis of the received unique code UCx (step S83). The digest value DIx is transmitted to the memory controller 13 (step S84).

The memory controller 13 uses the received digest value DIx as a read address and issues a read instruction RD[DIx] (step S85). From the memory region 12, the specific information HF2x stored in the address associated with the digest value DI is transmitted to the memory controller 13 in accordance with the read instruction RD [DIx] (step S86). Subsequently, the memory controller 13 transmits the received specific information HF2 to the hash function decrypting unit 14 (step S87).

The hash function decrypting unit 14 decrypts the received specific information HF2x with the received unique code UCx to generate the hash function HF1 (step S89). The hash function HF1 is transmitted to the encrypting unit 15 (step S90). The semiconductor device 5 starts the encrypted communication by using the hash function HF1 (step S91).

In the above description, in the semiconductor device 5 according to the fourth embodiment, the memory region 12 is filled with the specific information HF21 to HF2*n* encrypted with the unique codes UC1 to UC*n*. The semiconductor device 5 reads the specific information HF21 to HF2*n* which can be decrypted with the unique codes UC1 to UC*n* from the digest values DI1 to DI*n* generated in correspondence with the unique codes UC1 to UC*n* to decrypt the hash function HF1.

Normally, the number of pieces of the specific information HF2 stored in the memory region 12 is one. Consequently, even when an attacker analyzes the semiconductor device 5 according to the fourth embodiment, the attacker cannot determine whether the specific information stored in any of the regions is true specific information or not. By using the semiconductor device 5, the security on the hash function HF1 as confidential information can be improved.

The specific information stored in the memory region 12 is encrypted with any of the unique codes UC1 to UC*n*. Consequently, an attacker cannot understand the algorithm of the encryption only by referring to the specific information stored in the memory region 12. It can also improve security on the hash function HF1 as confidential information by using the semiconductor device 5 according to the fourth embodiment.

Fifth Embodiment

In a fifth embodiment, another form of a method of storing the specific information HF2 in the memory region 12 will be described. FIG. 13 is a conceptual diagram showing another form of the method of storing the specific information HF2. In the example shown in FIG. 13, the specific information HF2 is split and stored in a plurality of regions in the memory region 12. In the example shown in FIG. 13, the digest value DI is used as a value designating the number of splitting the specific information HF2 and also used as the head address of a region storing the digest value DI.

In the example shown in FIG. 13, 4 is generated as the digest value DI, and the specific information HF2 is expressed by 128 bits. In the example shown in FIG. 13, the first 32 bits of the specific information HF2 are stored in the region of the address 4, the specific information HF2 from the 33rd bit to the 64th bit is stored in the region of the address 5, the specific information HF2 from the 65th bit to the 96th bit is stored in the region of the address 6, and the specific information HF2 from the 97th bit to the 128th bit is stored in the region of the address 7. Since there is also a case where the number of splitting times is one, one region in the storage region 12 has capacity large enough to store the specific information HF2 which is not split. Consequently, in the case of splitting the specific information HF2 and storing the split information, a free space exists in one region. As shown in FIG. 13, it is preferable to store the dummy value in the free space for a reason that the specific information HF2 is concealed from the attacker.

As described above, to read the specific information HF2 from the memory region 12 in which the specific information HF2 is stored, the memory controller 13 generates a read instruction for reading the specific information HF2 from the digest value DI. More concretely, the memory controller 13 calculates the number of splitting times of specific information stored in one region in the memory region 12 on the basis of the digest value DI and accesses the memory region 12. The memory controller 13 generates read addresses of the number corresponding to the number of splitting times, reproduces the specific information HF2 from the information read from the plurality of regions using the read addresses, and gives the reproduced specific information HF2 to the hash function decrypting unit 14. In the example shown in FIG. 13, the digest value DI is used as the head address of the region in which the specific information HF2 is stored, so that the memory controller 13 generates read addresses of the number corresponding to the number of splitting times including the head address and read addresses subsequent to the head address from the digest value DI. As a location of storing split specific information, another address computed from the digest value DI may be designated.

FIG. 14 is a conceptual diagram showing another form of the method of storing the specific information HF2. In the example shown in FIG. 14, the specific information HF2 is split and stored into a plurality of regions in the memory region 12. In the example shown in FIG. 14, the digest value DI is used as a value of designating the number of bits (the number of splitting bits) of the specific information HF2 stored in one region in the memory region 12 and is used as the head address of a region storing the digest value DI.

In the example shown in FIG. 14, "4" is generated as the digest value DI, and the specific information HF2 is expressed by 128 bits. In the example shown in FIG. 14, the specific information HF2 is split by four bits, and each of the split specific information HF2 is stored in one region. Since there is also a case where the number of splitting bits is 128 bits, one region in the storage region 12 has capacity large enough to store the specific information HF2 which is not split. Consequently, in the case where the specific information HF2 is split, a free space exists in one region. As shown in FIG. 14, it is preferable to store the dummy value in the free space to conceal the specific information HF2 from the attacker. In the address regions 1 to n in which the specific information HF2 is stored, the location in which the specific information HF2 is written is not limited. More concretely, the present invention can be realized when HF2 [0:3] written in the address 4 in FIG. 14 is written in a region starting from the head bit of the address 4 as shown in FIG. 14 or in the other region.

As described above, to read the specific information HF2 from the memory region 12 in which the specific information HF2 is stored, the memory controller 13 generates a read instruction for reading the specific information HF2 from the digest value DI. More concretely, the memory controller 13 calculates the number of bits of the specific information HF2 stored in one region in the memory region 12 on the basis of the digest value DI and accesses the memory region 12. The memory controller 13 generates read addresses of the number corresponding to the value obtained by splitting the specific information HF2 by the number of splitting times, reproduces the specific information HF2 from the information read from the plurality of regions using the read addresses, and gives the reproduced specific information HF2 to the hash function decrypting unit 14. In the example shown in FIG. 14, the digest value DI is used as the head address of the region in which the specific information HF2 is stored, so that the memory controller 13 generates read addresses of the number corresponding to the value obtained by splitting the specific information HF2 by the number of splitting bits including the head address and read addresses subsequent to the head address from the digest value DI. As a location of storing split specific information, another address computed from the digest value DI may be designated.

As described above, by splitting the specific information HF2 on the basis of the digest value DI and storing the split information in the memory region 12, the specific information HF2 is stored in recording length which varies among devices. Consequently, even when an attacker analyzes the memory region 12, since the recording length of the specific information HF2 stored in one region varies among devices, the attacker cannot recognize which information is the specific information HF2. That is, by varying the recording length of the specific information HF2 on the basis of the digest value DI generated on the basis of the unique code UC which varies among devices, the security on the hash function HF1 as confidential information can be improved.

In the writing devices in the foregoing embodiments, by using the same unique code UC as that of a semiconductor device to which data is to be written, the same digest value DI as that of the semiconductor device is generated. By making the writing device execute the above-described splitting algorithm, the process of writing the specific information HF2 can be performed normally.

The present invention is not limited to the foregoing embodiments but can be properly changed without departing from the gist. A person skilled in the art naturally understands such that matters related to a plurality of embodiments are combined to one device, for example, the changes from the first embodiment to the second embodiment are applied to the fourth embodiment.

What is claimed is:

1. A semiconductor device comprising:
   a unique code generating circuit which includes a static random access memory (SRAM) which generates a plurality of unique codes and which outputs one unique code from the plurality of unique codes, each said unique code being generated using an initial value at time of start of the static random access memory;
   a unique code corresponding information generating circuit which generates unique code corresponding information from said one unique code;
   a memory region which has a plurality of storing regions each of which is assigned to a predetermined address, wherein specific information associated with each predetermined address is obtained by encrypting confidential information with the plurality of unique codes which are also stored in the plurality of storing regions, respectively, and whose assigned addresses are indicated by the unique code corresponding information; and
   a decrypting circuit which decrypts, with said one unique code, the specific information which is read from the one storing region by using the unique code corresponding information to generate the confidential information.

2. The semiconductor device according to claim. 1, further comprising:
   a memory controller configured to access the memory region using the unique code corresponding information,
   wherein the memory controller generates an address corresponding to the unique code corresponding information, reads the specific information from a region corresponding to the address in the memory region, and supplies the read specific information to the decrypting circuit.

3. The semiconductor device according to claim 1,
   wherein the confidential information is an encryption key used in an encrypting process.

4. The semiconductor device according to claim 3, further comprising:
   an encrypting circuit encrypting information to be transmitted by using the encryption key.

5. The semiconductor device according to claim 1,
   wherein the unique code is a value in which the presence or absence of an error bit varies according to a read timing.

6. The semiconductor device according to claim 1,
   wherein the unique code is Physically Unclonable Function (PUF) data including a bit which becomes undetermined due to manufacture variation in an element of the semiconductor device.

7. The semiconductor device according to claim 1, further comprising:
   an error correcting circuit configured to correct an error included in the unique code.

8. The semiconductor device according to claim 1,
   wherein the unique code generating circuit includes a selection circuit to select said one unique code from the plurality of unique codes.

* * * * *